(12) United States Patent
Chernov

(10) Patent No.: US 11,995,192 B2
(45) Date of Patent: May 28, 2024

(54) SYSTEM FOR STATIC ANALYSIS OF BINARY EXECUTABLE CODE AND SOURCE CODE USING FUZZY LOGIC AND METHOD THEREOF

(71) Applicant: Daniil Vladimirovich Chernov, Sharjah (AE)

(72) Inventor: Daniil Vladimirovich Chernov, Sharjah (AE)

(73) Assignee: Daniil Vladimirovich Chernov, Sharjah (AE)

( * ) Notice: Subject to any disclaimer, the term of this patent is extended or adjusted under 35 U.S.C. 154(b) by 205 days.

(21) Appl. No.: 17/551,759

(22) Filed: Dec. 15, 2021

(65) Prior Publication Data

US 2023/0177168 A1 Jun. 8, 2023

(51) Int. Cl.
*G06F 21/57* (2013.01)
*G06F 21/56* (2013.01)

(52) U.S. Cl.
CPC .......... *G06F 21/577* (2013.01); *G06F 21/563* (2013.01); *G06F 2221/033* (2013.01)

(58) Field of Classification Search
CPC . G06F 21/577; G06F 21/563; G06F 2221/033
See application file for complete search history.

(56) References Cited

U.S. PATENT DOCUMENTS 5,491,775 A * 2/1996 Madau ..................... G06N 7/04
706/900
5,751,908 A * 5/1998 Madau ............... G05B 13/0275
706/900

(Continued)

FOREIGN PATENT DOCUMENTS

RU          2697948 C1    8/2019
WO   WO-2015/171746 A1   12/2015

(Continued)

OTHER PUBLICATIONS

International Search Report and Written Opinion of corresponding International Application No. PCT/RU2021/000559, dated Sep. 1, 2022, 6 pages.

*Primary Examiner* — Meng Li

(74) *Attorney, Agent, or Firm* — Muncy, Geissler, Olds & Lowe, P.C.

(57) ABSTRACT

A computer-implemented static analysis system for binary executables and source code configured to detect vulnerabilities, undocumented features and other input program errors. The system uses a fuzzy logic engine to reduce a number of false positives and false negatives results. The system has a decompiler configured to receive a source code of an input program and represent the input program in a target low-level language code (LLC) intermediate representation (IR) and a frontend configured to receive a binary code representation of the input program and represent the input program in the target LLC IR. The system further has an analyzer configured to receive the target LLC IR and analyze the target LLC IR to detect vulnerabilities, undocumented features and input program errors using predetermined rules stored in a rule module and provided to the analyzer. The analyzer uses the fuzzy logic engine to receive substantially more accurate results.

12 Claims, 5 Drawing Sheets

(56) References Cited

U.S. PATENT DOCUMENTS

| | | | |
|---|---|---|---|
| 11,620,389 B2* | 4/2023 | Karabatis | G06F 18/24 |
| | | | 726/25 |
| 2008/0028469 A1* | 1/2008 | Repasi | G06F 21/554 |
| | | | 726/24 |
| 2012/0072968 A1 | 3/2012 | Wysopal et al. | |
| 2016/0371494 A1* | 12/2016 | Daymont | G06F 11/3668 |
| 2018/0196694 A1* | 7/2018 | Banerjee | G06F 9/466 |

FOREIGN PATENT DOCUMENTS

| | | | | |
|---|---|---|---|---|
| WO | WO-2015191746 A1 * | 12/2015 | | G06F 11/362 |
| WO | WO-2018/071491 A1 | 4/2018 | | |

\* cited by examiner

SYSTEM FOR STATIC ANALYSIS OF BINARY EXECUTABLE CODE AND SOURCE CODE USING FUZZY LOGIC AND METHOD THEREOF

BACKGROUND

The present invention generally relates to computer program analysis systems. More specifically, the present invention relates to a system for static analysis for binary executables and source code using fuzzy logic and method thereof.

One of the important stages of the development process of current information systems is assessing the information security of the computer program. That is, evaluating the security of information resources and the information system from unauthorized access, use, leakage, modification, or destruction to comply with standards of confidentiality, integrity and availability of information to users. Determination of the security properties of the computer program generally includes the analysis of the program components for the presence of vulnerabilities that violate the integrity of the information security of the computer program. Such analysis usually includes decompilation of computer program code. It is important to note that modern computer systems use and include software components, the code of which is partially or completely inaccessible for such assessment.

Various tools exist to allow the decompilation of computer program code to find and identify code vulnerabilities of the computer program. More specifically, the techniques that have been used involve decompilation of the computer program to parse executable code, identifying and recursively modeling data flows, identifying and recursively modeling control flow, and iteratively refining these models to provide a complete model at the fundamental code level.

Another technique is to employ a set of analyses that sifts through the program code and identifies programming security and/or privacy model coding errors. A further evaluation of the program is then performed using control and data flow analyses.

Another approach is where the source code is parsed into an intermediate representation. Models are derived for the code and then analyzed in conjunction with pre-specified rules about the routines to determine if the routines possess one or more of pre-selected vulnerabilities.

These approaches often result in large numbers of false positive indications and do not provide features for elimination of the detected vulnerabilities and errors.

Further, the often-slow development of methods and tools for analyzing program code and the lack of acceptable approaches and software tools for studying binary images of programs leads to the need to systematize and automate systems and methods for analyzing the computer program code. Moreover, the issues relating to analyzing computer programs for vulnerabilities, the code of which is partially, or completely inaccessible need still be addressed.

Eliminating vulnerabilities requires not only detection, but also the correct description of rules to exploit or fix detected vulnerabilities.

There is, therefore, a need to provide an analysis system for binary executables and source code in the absence of the source code that accurately detects and identifies vulnerabilities, as well as provides detailed recommendations on how to address vulnerabilities.

SUMMARY

In one aspect, the present invention provides a computer-implemented static analysis system for binary executables and source code configured to detect vulnerabilities, undocumented features, and other input program errors. The system has a decompiler operating on a processor configured to receive a source code of an input program and represent the input program in a target low-level language code (LLC) intermediate representation (IR) and a frontend operating on the processor configured to receive a binary code representation of the input program and represent the input program in the target LLC IR. The system further has an analyzer configured to receive the target LLC IR and analyze the target LLC IR to detect vulnerabilities, undocumented features and input program errors using predetermined rules stored in a rule module and provided to the analyzer. The system is configured to output a security report by a security report module.

In another aspect of the present invention, the target LLC IR is a Low Level Virtual Machine (LLVM) Intermediate Representation (IR).

In yet another aspect of the present invention, the analyzer of the system uses a fuzzy logic engine to reduce a number of false positives and false negatives results.

In another aspect, the present invention provides a method for analyzing binary executables and source code of an input program to detect vulnerabilities, undocumented features, and other input program errors. The method includes identifying a presentation of the input program to determine whether the input program is presented in a source code or a binary code. If the input program is presented in the source code, the method includes processing the input program by a decompiler to represent the input program in a target low-level language code (LLC) intermediate representation (IR). On the other hand, if the input program is presented in the source code, the method provides for processing the input program by a frontend to represent the input program and represent the input program in the target LLC IR. The method further includes analyzing by an analyzer the target LLC IR to detect vulnerabilities, undocumented features and input program errors using predetermined rules stored in a rule module and provided to the analyzer. Lastly, the method includes outputting a security report by a security report module.

BRIEF DESCRIPTION OF THE DRAWINGS

In order for the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Figure 1:
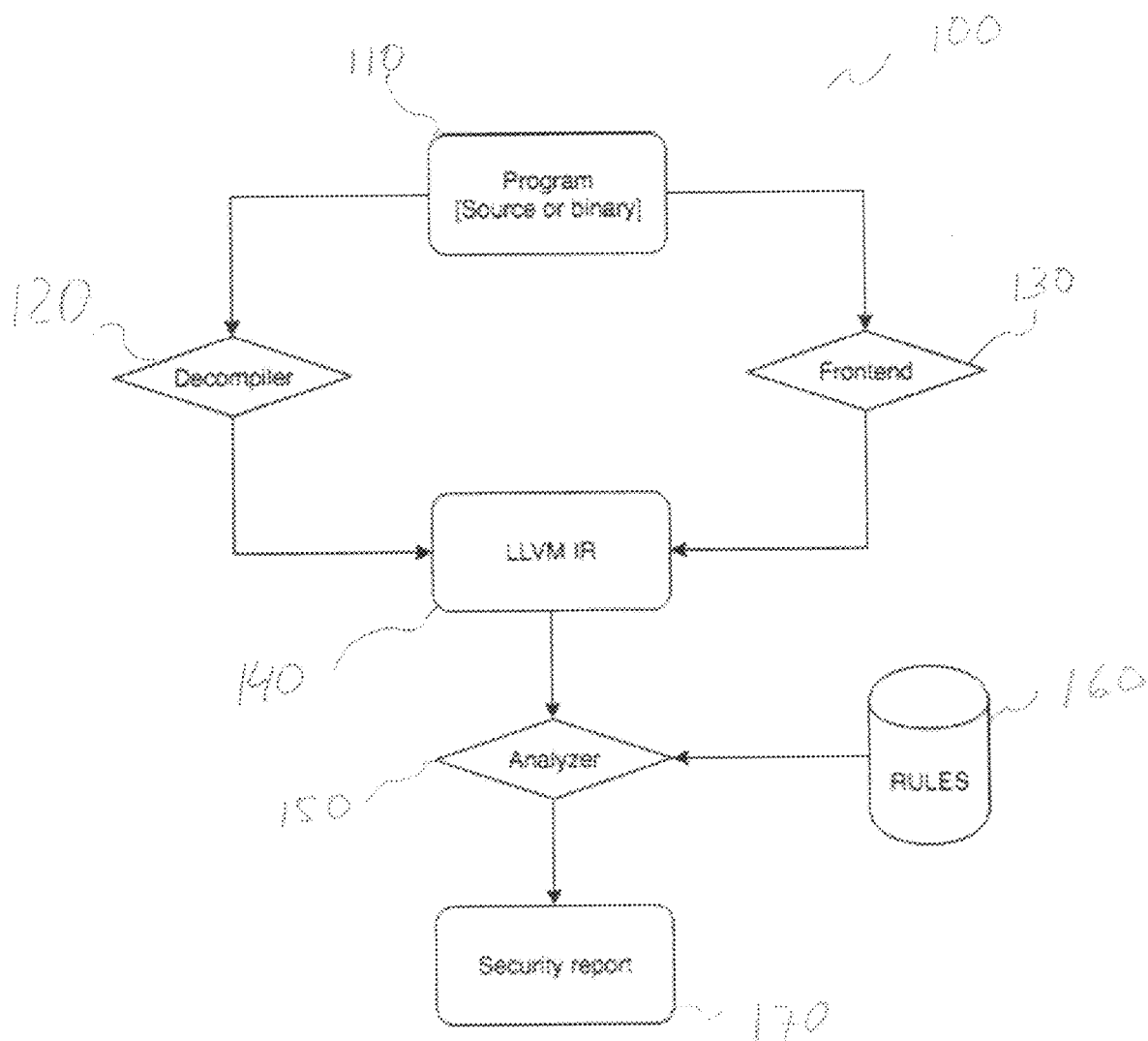
FIG. 1 depicts a diagram of a static analysis system for binary executables and source code according to embodiments of the invention.

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

One of the important stages of the development process of information systems is assessing the security of the computer program from unauthorized access, use, leakage, modification, or destruction to comply with standards of confidentiality, integrity, and availability of information to users. Determination of the security properties of the computer program generally includes decompilation of computer program code and analysis of the code for the presence of vulnerabilities that violate the integrity of the information security of the computer program.

Various tools exist to allow the decompilation of computer program code to identify and address vulnerabilities, which create potential risks of compromising security of the computer program, and undocumented features (i.e., unintended or undocumented hardware operation) of the computer program. The decompilation techniques are often used in connection with a static analysis of the computer program. A static analysis is a type of analysis that allows identification of vulnerabilities in the code without executing it.

Various techniques have been used that involve decompilation to parse executable code, identifying and recursively modeling data flows, identifying and recursively modeling control flow, and iteratively refining these models to provide a complete model at the code level of the target program.

Generally, a decompiler is a reverse engineering tool which transforms a machine code into a High-level Language (HLL) formatted code, which plays an important role in the static analysis. There are various decompilers, such as, for example, an online-available decompiler which covered 32-bit architectures. The goal of decompilation is to build an easily readable High-level Language Code (HLLC) without any modifications or changes in the program behavior that can support an analysis of the target program. In contrast, a compiler is a program that translates source code written in HLL to a target language, a Low-level Language Code (LLC) for a processor to read and run. Since the decompiler reverses the compiling process, it has the same transforming steps as a compiler. These tools are useful when the source code of a program is unavailable, for example, in the case of a security analysis.

Additionally, a debugger and dissembler can be used in connection with static analysis for reverse engineering. This tool shows a control flow and data flow of the computer program and provides a view of the program's semantic and behavior. However, using assembly code for static analysis requires knowledge in architectures of the target program and is expensive; and therefore, a decompiler with accessible intermediate representation code can be practical to save time for analysis.

Optimization techniques, such as propagation and elimination are frequently used during the data flow analysis. Propagation supports feasible code elimination, which removes unnecessary statements or unreachable blocks. Propagation and elimination techniques can work with a Low Level Virtual Machine (LLVM) intermediate representation code after binary translation. Moreover, editing control flow analysis techniques can be used to generate source-like high-level language code. The resulting code generated is then compared with the sample source code to verify the correctness of the decompiler framework and identify vulnerabilities.

These approaches often result in large numbers of false positive indications and do not provide features for elimination of the detected vulnerabilities and errors. Moreover, the issues relating to analyzing computer programs for vulnerabilities, the code of which is partially, or completely inaccessible need still be addressed.

Eliminating vulnerabilities requires not only detection, but also the correct description of rules to exploit or fix detected vulnerabilities. Known solutions have not been able to provide features that eliminate detected vulnerabilities and undocumented features and, for example, allow for reconfiguration of a web application firewall (WAF).

There is, therefore, a need to provide an analysis system for binary executables and source code in the absence of the source code that accurately detects and identifies vulnerabilities, as well as provides detailed recommendations on how to address vulnerabilities. Thus, other improvements needed that allow identification and correction of vulnerabilities in the code, for example, without executing it.

In light of the forgoing limitation of the existing systems, the present invention discloses a static analysis system for binary executables and source code. The static analysis system of the present invention uses LLVM Intermediate Representation (IR) code as an intermediate representation for decompiled binaries. The system can recover high-level semantics of the target program. During decompilation functions of the system, variables and their types are examined and are represented in LLVM bytecode. The resulting bytecode can be then analyzed via any static analysis method that can be run on LLVM bytecode. Moreover, a fuzzy logic engine described herein allows a user to filter and reduce the number of false positives and false negatives when detecting vulnerabilities and undocumented features.

Using a compiler frontend of the present invention for LLVM, targeting programming languages, the system can represent any program in that language as LLVM IR. For example, using the clang frontend, the system can translate any valid C/C++/Objective-C/Objective-C++ program to LLVM bytecode. Accordingly, it is possible to apply same methods of static code analysis, such as taint analysis or symbolic execution and the like to programs and program components whether the source code is available or not, or even analyze interaction between components of the source, including binary components, such as third-party libraries without having access to the source code.

The static analysis system of the present invention includes a decompiler that is configured to recovered source program representation, including high-level details like functions and their arguments, variables and their types. The decompiler aims to produce a representation of the source program written in LLVM IR, semantically similar to representation of the source program produced by compiler frontends for target programming languages.

The decompiler can include a set of utilities intended for automatic generation of binary function signatures. For example, given a static library (.a, .lib) or an object file (.o, .obj) and a list of corresponding header files, the decompiler produces a list of binary function signatures of that library or object file. A generated bundle of binary function signatures is used during decompilation to recognize known functions such as standard library functions and the like.

The static analysis system of the present invention is capable of accurate and precise function boundaries reconstruction. The system iteratively discovers an input binary file, separating code chunks from data. During boundaries reconstruction stage system accumulates control flow and data flow information about recovered functions, including, for example, precise information about possible offset of stack pointer in every point of program being decompiled.

The static analysis system of the present invention also includes a reconstruction of high-level semantics of the source program for precise recovery for program variables. That is, the system defines and solves a set of constraints for types of program memory objects. A system of constraints is determined from "natural" binary operations semantics and known type information, for example, from known function signatures or recovered runtime information.

When using the static analysis system of the present invention to analyze the source code and binary code of a target program, the following tasks can be solved.

Recovery and/or definition of a control flow graph of the target program can be determined. In particular, a set of subroutines of the target program can be defined, including the implementation of the recovery of late binding information and mechanisms for handling exceptions. The control flow graph of the target program defines the principle of how the program should be executed during its execution.

Properties of subroutines of the target program can be restored, such as the sets of destinations for implicit tabular jumps, the offset settings of the stack pointer value for subroutine call instructions, and definition of subroutine calling conventions.

A set of objects of the program memory model can be also defined. That is, definitions of local and global variables of the target program and their types.

The static analysis system of the present invention identifies errors, which indicate vulnerabilities of the code based on signature sets of subroutines using archived sets of program modules and determining the occurrences of subroutines of the target program by the sets of defined subroutine signatures.

FIGS. 1-4 show detailed diagrams of embodiments of the present invention. In particular, FIG. 1 shows a high-level diagram of embodiments of a static analysis system 100 for binary executables and source code. An input program 110 that can be a binary executable code or source code.

Depending on the type of the input program 110, the input program 110 is processed by either a decompiler 120 or a frontend 130. More specifically, if the input program 110 is presented as a source code, then the input program's 110 source code undergoes a compilation process by the decompiler 120 block to be examined and represented in a Low Level Virtual Machine (LLVM) Intermediate Representation (IR) code 140 as an intermediate representation of the input program 110.

The compilation process is generally known in the art and can include front-end, middle-end and back-end stages. The front-end performs code analysis, such as lexical, syntax, semantic or the like, to generate a non-optimized intermediate code. The middle-end involves transforming the output front-end into an optimized intermediate code. In the back-end stage, optimized intermediate code is translated into low level target code, such as LLVM.

On the other hand, if the input program 110 is presented in a binary code, the input program 110 is processed by a frontend 130 block to be represented in the LLVM IR code 140. The frontend 130 can be the clang frontend system that translates any valid C/C++/Objective-C/Objective-C++ program to a target Low-level Language Code (LLC), for example, LLVM bytecode. The frontend 130 can run two linguistic analyses to remove machine dependency from the code: syntax analysis and semantic analysis. Different architectures known in the art can use different operator instructions and data formats.

According to embodiment of the present invention, during decompilation and frontend functions as described above, variables of the input program 110 are examined and are represented in the LLVM IR code 140 as an intermediate representation of the input program 110. That is, the LLVM IR code 140 is used for representation of, for example, data flow (variables' information) and control flow (the input program's running path) information.

The LLVM IR code 140 of the input program 110 can then be analyzed to determine security vulnerabilities or other known and/or unknown risk factors using pre-determined rules of a rules module 160.

As shown in FIG. 1, according to embodiments of the present invention, LLVM IR code 140 is analyzed by an analyzer 150. That is, the analyzer 150 is configured to receive and analyze LLVM IR code 140 to detect vulnerabilities and undocumented features based on the pre-determined rules by using, for example, Taint Analysis (analysis of the flow of user input in an application code to determine if unanticipated input can affect program execution in malicious ways), methods of symbolic interpretation (Symbolic Execution) and the like.

According to embodiment of the present invention, the analyzer 150 applies static analyses Static Application Security Testing (SAST) algorithms to LLVM IR code 140, such as lexical, syntax, semantic, Taint, constant propagation, type propagation, synonym and control flow graph analysis to determine an enriched code model. The enriched code models can be any of the following models known in the art, such as, program source text, token flow, Abstract Syntax Tree (AST), three-address code, control flow graph, standard or proprietary byte code and the like.

More specifically, lexical, syntax, and semantic analysis techniques can be used to create an internal representation, such as, Abstract Syntax Tree (AST). Lexical analysis breaks up a program text into tokens, i.e., smallest meaningful elements, and generates a token flow. Syntax analysis checks if this token flow is valid in terms of programming language syntax. Semantic analysis checks the fulfillment of more complex conditions, such as data type matching in assignment statements. A resulting AST can be used as an internal representation or a source for building other models through translation into a three-address code to then build a control flow graph. Control flow graph is the main model for SAST algorithms.

Data flow analysis identifies, at each program point, information that may be stored in variables such as a variable type, constant value, and other variables pointing at this data. The task of data flow analysis depends on what information needs to be identified.

TABLE 1

Task of Data Flow Analysis

| What is needed to be identified? | Data Flow Analysis Task |
|---|---|
| Whether an expression is a constant Constant value | Constant propagation |
| Variable type | Type propagation |
| Which variables point at a specific memory area (store the same data) | Synonym analysis |

Data flow analysis tasks require exponential time, and an analyzer (i.e., analyzer 150) makes certain optimizations and assumptions. Due to the complexity of data flow analysis tasks, generally, analyzers are often exhibit slow analysis, large resource consumption, and false positives. However, inter-procedural data flow analysis is mandatory for the most critical vulnerabilities to be revealed. Taint analysis is used to track labels assigned to data at certain program points. Taint analysis is used by the analyzer 150 for information security and is the method used to detect vulnerabilities related to data leaks (writing passwords to event logs, insecure data transmission) and data injections, such as SQL injections, cross-site scripting, open redirects, file path forging, and the like.

As shown in FIG. 1, a rules module 160 provides program specific information, such as vulnerability search rules, to the analyzer 150. Vulnerability search rules can be stated in terms of code model and describe which indicators in the LLVM IR code 140 can be evidence of a vulnerability and/or undocumented feature. The rules will vary depending on the input program 110, such as the language it's written and its functionalities.

According to embodiment of the present invention, the analyzer 150 uses a fuzzy logic engine to minimize both false positives and false negatives (missed vulnerabilities and undocumented features). More specifically, the fuzzy logic engine uses a fuzzy set of pairs (P, m), where P is a set of positives, all of which have a patternId or just set of patternId, and m: P→[0, 1] a membership function which attributes confidence.

According to embodiments of the invention, the fuzzy logic engine has two membership functions: a background (the development side) and an outside (client-side).

The background side works as a part of the development process. It accumulates all the data which is defined below and makes decisions that are sent with the system updates to all customers. For this part of the engine, the set P will be set of patternId.

The fuzzy logic engine considers the following metrics:

Variety of complaining clients on the project;

Number of complaining client on the project;

Variety of projects from which complaints are received;

Number of the projects;

Number of complaints.

For implementing these requirements, the following entropy formula (I) can be used:

$$H = -\sum_{n=1}^{N} p_n \log p_n, \quad \sum_{n=1}^{N} p_n = 1,$$

$p_n$—is the percentage of errors among all mistakes made for all projects (relative to one pattern)—is the report rule unit. When applying the above entropy formula (I) to account for variety of clients, the result is as follows:

$$M = \sum_{n=1}^{N} M_n,$$

$$M_n = p_n \log p_n \sum_{m=1}^{k_n} u_{n,m} \log u_{n,m}$$

$u_{n,m}$—is the number of times the m-th user in the n-th project complained about the pattern, divided by the total number of complaints in the project from all different users, $k_n$—is the total number of users who participated in reviews for the n-th project. If only one user complained about a pattern in the project, then the coefficient in front of the $p_n$ log $p_n$ term is zeroed and the following formula will apply:

$$M_n = -p_n \log p_n \left( -\sum_{m=1}^{k_n} u_{m,n} \log u_{n,m} + 1 \right)$$

Entropy is appropriate because it is maximized in situations where $p_n$ or $u_{n,m}$, are uniformly distributed. Moreover, if their total number grows, then the maximum increases.

For example, $$H = -\frac{1}{2^n} * \log \frac{1}{2^n} * 2^n = n$$

$$-\frac{1}{4} * \log \frac{1}{4} * 4 = 2$$

Figure 2A:
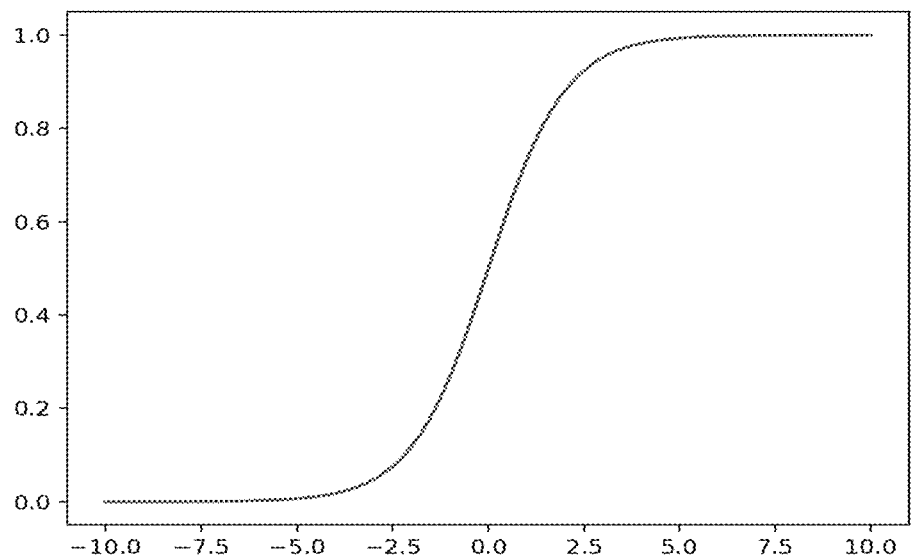
FIG. 2A-2C depicts graphs of results of an analyzer of the static analysis system in accordance with embodiments of the invention.
Figure 2B:
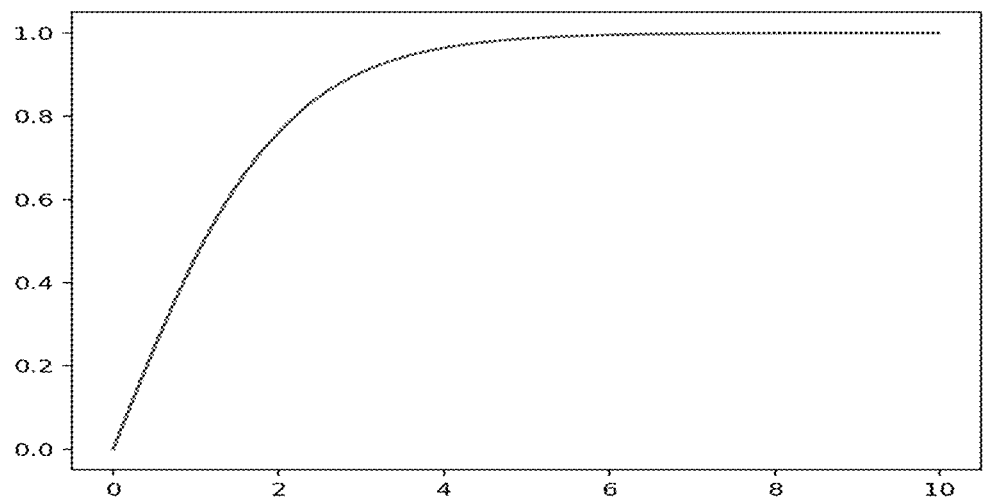

If the number of complaints is not taken into the account, the following function $$\frac{1}{1+e^{-x}}.$$

is considered. The graphs showing the results of the above computations are shown in FIGS. 2A-2B.

If considering x>0, multiply it by two and subtract one, the following $$\frac{1-e^{-x}}{1+e^{-x}}..$$

is true. Then, the formula will be as follows:

$$M_n = -p_n \log p_n (-\sum_{m=1}^{k_n} u_{n,m} \log u_{n,m} + 1) \frac{1-e^{-c_n}}{1+e^{-c_n}}$$

$$m(patternId) = \frac{1-e^{-\frac{M}{c}}}{1+e^{-\frac{M}{c}}},$$

where $c_n$—is the number of reports on the project and m(patternId)—is the membership function.

For example, if the number of projects be $2^n$, and the number of different users on the project is $2^m$, and all distributions are uniform, so that the value of the metric is maximum $c_n$ will be considered large enough for the last factor to be approximately 1. The formula will then be:

$$M = -\log \frac{1}{2^n}(-\log \frac{1}{2^m} + 1) = n(m+1)$$

That is, as an example, with 16 projects and 4 different users per project, as well as with a uniform distribution, the value (and a sufficiently large number of complaints) is obtained:

$$M = 4(2+1) = 12$$

This is the maximum value that can be achieved with 16 projects and 64 users.

Figure 2C:
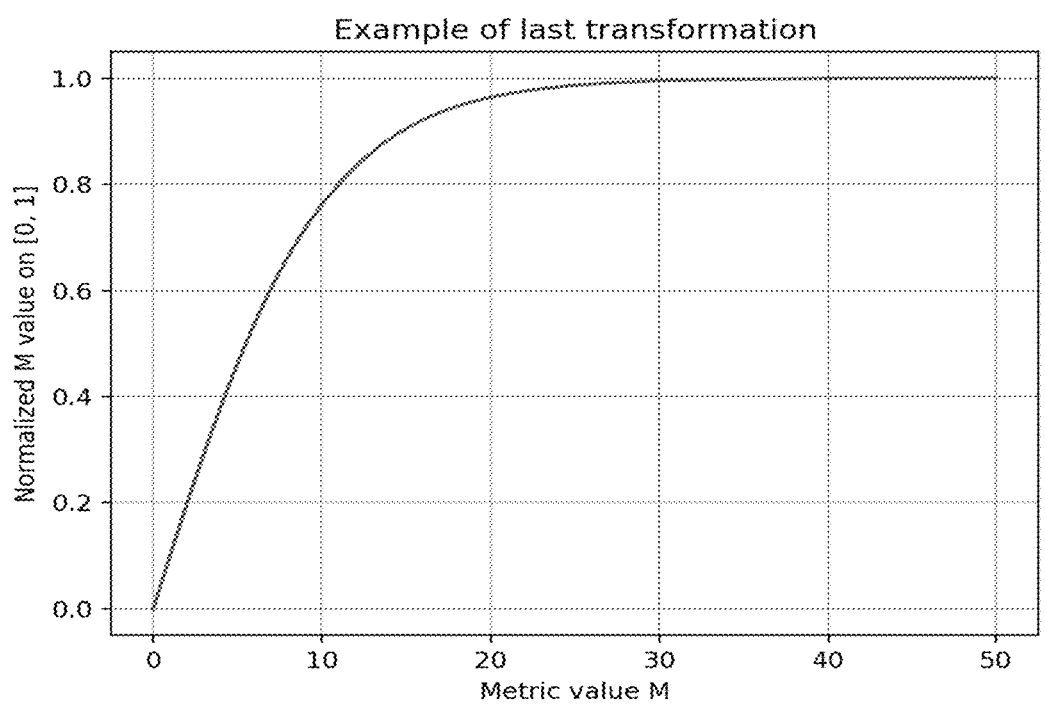

To display this value in the segment [0, 1], the sigmoid can be used with an argument divided by 5, for example, so that starting from about 12 we get confidence equal to 1 as shown on the graph of FIG. 2C.

The outside (client-side of the engine) accumulates all the data which is defined below and makes decisions that are sent with the system updates to all customers. For this part of the engine, the set P will be set of patternId.

It has been determined that the number of positives in a project for a certain vulnerability (pattern), which is most likely to be false, is significantly higher than that of a vulnerability, with a smaller number of positives. For this part of the engine, the set P will be set of positives of each analysis result. For example, the number of detections of the "weak hashing algorithm" vulnerability is on average 200% higher than that of other vulnerabilities. In such a situation, it is difficult for the analyzer 150 to correctly determine the vulnerability. This trigger will be valid only when working with confidential data, which directly depends on the context of the program and cannot be 100% determined by the analyzer 150. It is reasonable to assume that this vulnerability (pattern) will have a small confidence value.

It has been determined that it is possible to determine the dependence of confidence on the number of patterns triggering by the exponential regression equation:

$$y = e^{a+bx}$$

Where a is:

$$a = \frac{1}{n} \Sigma \ln y_i - \frac{b}{n} \Sigma x_i$$

And b is:

$$b = \frac{n \Sigma x_i \ln y_i - \Sigma x_i \cdot \Sigma \ln y_i}{n \Sigma x_i^2 - (\Sigma x_i)^2}$$

Where x—is the confidence, y—is the ratio of the number of positives in the pattern to the total number of positives, n—is the number of triggered patterns.

To apply this formula, all the positives need to be normalized. For example, if an analysis of 138267 lines of PHP code found 195 positives. Among which there were 100 responses with medium criticality (severity=2), where 7 patterns were worked:

TABLE 2

PatternId and Number of Positives

| patternId | Number of positives ($N_{patternId}$) |
|---|---|
| patternId__1 | 10 |
| patternId__2 | 1 |
| patternId__3 | 13 |
| patternId__4 | 3 |
| patternId__5 | 1 |
| patternId__6 | 31 |
| patternId__7 | 41 |

Now the ratio of the number of triggers in the pattern to the total number of triggers can be determined. This approach will be universal for any number of positives in a project, for example, 10,000 or 100.

For example, considering this ratio:

TABLE 3

PatternId Ration

| patternId | Ratio (y) |
|---|---|
| patternId__1 | 10/100 |
| patternId__2 | 1/100 |
| patternId__3 | 13/100 |
| patternId__4 | 3/100 |
| patternId__5 | 1/100 |
| patternId__6 | 31/100 |
| patternId__7 | 41/100 |

Figure 3:
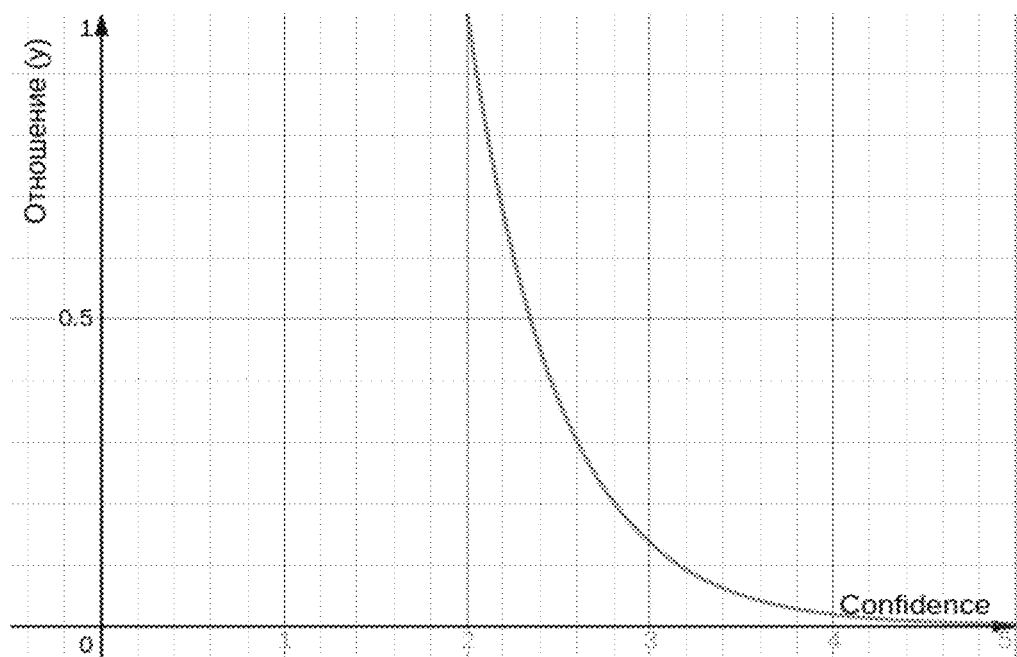
FIG. 3 depicts a graph of ratios of the analyzer's values of the static analysis system in accordance with embodiments of the invention.

The found ratios determine they values in the formula as set forth in the graph in FIG. 3.

Key performance indicators tracked and analyzed by the analyzer 150 include the number of both false positives and false negatives. Hence, fuzzy logic engine described in the preceding paragraphs allows the user to filter and reduce the number of false positives and false negatives when detecting vulnerabilities and undocumented features.

As also shown in FIG. 1, according to embodiments of the present invention, the static analysis system 100 includes a security report module 170. The security report module can, among other things, allow the user to: (a) highlight detected vulnerabilities and undocumented features even when analyzing an executable file; (b) compare test results within one project or different groups of projects to track the progress of vulnerability elimination or occurrence (changes specific to code writing process can be taken into account); (c) provide recommendations for cybersecurity and/or development teams, such as (i) development-specific and detailed reporting of vulnerabilities and undocumented features, with a focus on vulnerable code fragments, and recommendations on how to modify code to eliminate such vulnerabilities, and/or (ii) cybersecurity-specific reporting with detailed recommendations on how to eliminate revealed vulnerabilities and undocumented features, including description of exploitation methods (with detailed web application firewall (WAF) configuration recommendations to block and prevent any possibility of exploiting vulnerabilities during code corrections; (iii) export reports in portable document format (PDF) format, including reports generated in line with the vulnerability classification adopted in PCI DSS, OWASP Top 2017, OWASP Mobile Top 10 2016, HIPAA or CWE/SANS Top 25; and (iv) to receive verification status updates via email.

Fuzzy logic engine can be also used by security report module 170 to show most probable errors in the input program 110, e.g., vulnerabilities and undocumented features.

Figure 4:
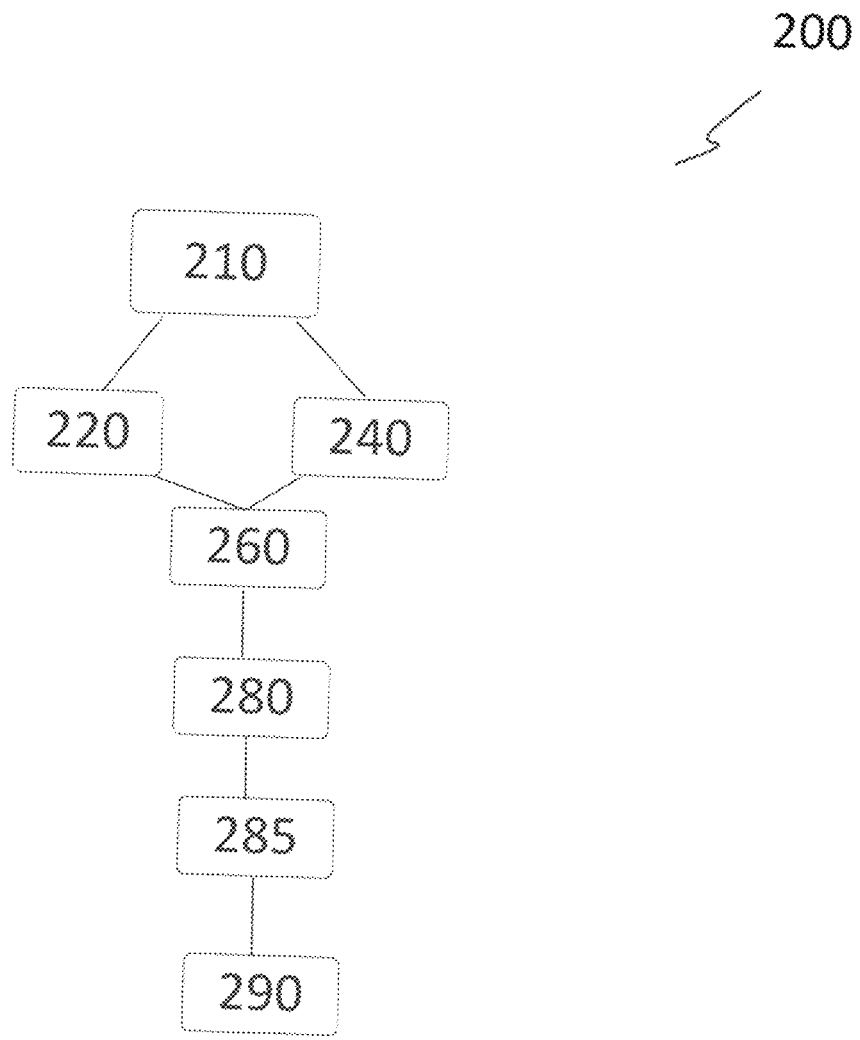
FIG. 4 depicts a flow diagram illustrating a method for detecting vulnerabilities using the static analysis system for binary executables and source code according to abandonments of the present invention.

FIG. 4 is a flow diagram illustrating a method 200 for detecting vulnerabilities using the static analysis system 100 for binary executables and source code according to abandonments of the present invention. The method 200 includes identifying a presentation of the input program 110 (a source code or a binary code), shown in a block 210.

If the input program 110 is presented in a source code, the decompiler 120 of the static analysis system 100 processes the input program 110 (as shown in a block 220) to generate LLVM IR code 140, shown in a block 260, as an intermediate representation of the input program 110.

In alternative, if the input program 110 is presented in a binary code, the frontend 130 of the static analysis system 100 processes the input program 110 (as shown in a block 240) to generate LLVM IR code 140, shown in the block 260, as an intermediate representation of the input program 110.

A block 280 analyzes the LLVM IR code 140 by the analyzer 150 to detect vulnerabilities and undocumented features using the pre-determined rules of the module 160 by using, for example, Taint Analysis, methods of symbolic interpretation and the like.

According to embodiments of the present invention, a block 285 applies fuzzy logic engine to the results of the block 280 to minimize false positives and false negative results.

A block 290 generates a security report by using the security report module 170. The security report can include: (a) detected vulnerabilities and undocumented features even when analyzing an executable file; (b) test results within one project or different groups of projects to track the progress of vulnerability elimination or occurrence; (c) recommendations for cybersecurity and/or development teams, such as (i) development-specific and detailed reporting of vulnerabilities and undocumented features, with a focus on vulnerable code fragments, and recommendations on how to modify code to eliminate such vulnerabilities, and/or (ii) cybersecurity-specific reporting with detailed recommendations on how to eliminate revealed vulnerabilities and undocumented features, including description of exploitation methods (with detailed web application firewall (WAF) configuration recommendations to block and prevent any possibility of exploiting vulnerabilities during code corrections; (iii) export reports in portable document format (PDF) format, including reports generated in line with the vulnerability classification adopted in PCI DSS, OWASP Top 2017, OWASP Mobile Top 10 2016, HIPAA or CWE/SANS Top 25; and (iv) to receive verification status updates via email.

Fuzzy logic engine can be also used by security report module 170 to include in the security report most probable errors in the input program 110, e.g., vulnerabilities and undocumented features.

According to embodiment of the present invention, the static analysis system 100 can be applied to the source codes written in more than 30 programming languages, such as, ABAP, Apex, ASP.NET, COBOL, C#, C/C++, Objective-C, Delphi, Dart, Go, Groovy, HTML5, Java, Java for Android, JavaScript, JSP, Kotlin, Pascal, Perl, PHP, PL/SQL, T/SQL, Python, Ruby, Rust, Scala, Solidity, Swift, TypeScript, VBA, VB.NET, VBScript, Visual Basic 6.0, Vyper, and 1C.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possible equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented static analysis system for binary executables and source code to detect vulnerabilities, undocumented features and other input program errors, the system comprising:
    at least one computing device having a processor;
    a decompiler operating on the processor configured to receive a source code of an input program and represent the input program in a target low-level language code (LLC) intermediate representation (IR);
    a frontend operating on the processor configured to receive a binary code representation of the input program and represent the input program in the target LLC IR;
    an analyzer configured to receive the target LLC IR and analyze the target LLC IR to detect vulnerabilities, undocumented features and input program errors using predetermined rules stored in a rule module and provided to the analyzer,
    the analyzer having a fuzzy logic engine to reduce a number of false positives and false negatives results; and a security report module comprises outputting a security report that comprises the vulnerabilities, the undocumented features and the input program errors detected by the analyzer, wherein the fuzzy logic engine uses a fuzzy set of pairs (P, m), where P is a set of positives, all of which have a patternId, and m: P→[0, 1] a membership function which determines confidence.

2. The system according to claim 1, wherein the target LLC IR is a Low Level Virtual Machine (LLVM) Intermediate Representation (IR).

3. The system according to claim 1, wherein the fuzzy logic engine considers a plurality of metrics, the plurality of metrics comprising:
variety of complaining clients on each project;
number of complaining client on each project;
variety of projects from which complaints are received;
number of the projects; and
number of complaints.

4. The system according to claim 3, wherein the fuzzy logic engine applies the following formula (I):

$$H = -\sum_{n=1}^{N} p_n \log p_n, \sum_{n=1}^{N} p_n = 1, \tag{I}$$

where $p_n$ is a percentage of errors among all mistakes made for all projects relative to a single pattern and N is a number of patterns.

5. The system according to claim 1, wherein the analyzer configured to use taint analysis and/or symbolic interpretation analysis.

6. The system according to claim 1, wherein the security report comprises: (a) detected vulnerabilities and undocumented features; (b) results within one project or different groups of projects to track the progress of vulnerability elimination or occurrence; (c) recommendations for cybersecurity and/or development teams; and (d) web application firewall (WAF) configuration recommendations to block and prevent possibility of exploiting vulnerabilities during the input program corrections.

7. A computer-implemented method for analyzing binary executables and source code of an input program to detect vulnerabilities, undocumented features and other input program errors, the method comprising:
identifying a presentation of the input program to determine whether the input program is presented in a source code or a binary code;
if the input program is presented in the source code, processing the input program by a decompiler to represent the input program in a target low-level language code (LLC) intermediate representation (IR);
if the input program is presented in the source code, processing the input program by a frontend to represent the input program and represent the input program in the target LLC IR;
analyzing by an analyzer the target LLC IR to detect vulnerabilities, undocumented features and input program errors using predetermined rules stored in a rule module and provided to the analyzer, wherein the analyzer comprises a fuzzy logic engine to reduce a number of false positives and false negatives results; and
outputting a security report by a security report module that comprises the vulnerabilities, the undocumented features and the input program errors detected by the analyzer,
wherein the fuzzy logic engine uses a fuzzy set of pairs (P, m), where P is a set of positives, all of which have a patternId, and in: P→[0, 1] a membership function which determines confidence.

8. The computer-implemented method according to claim 7, wherein the target LLC IR is a Low Level Virtual Machine (LLVM) Intermediate Representation (IR).

9. The computer-implement method according to claim 8, wherein the security report comprises: (a) detected vulnerabilities and undocumented features; (b) results within one project or different groups of projects to track the progress of vulnerability elimination or occurrence; (c) recommendations for cybersecurity and/or development teams; and (d) WAF configuration recommendations to block and prevent possibility of exploiting vulnerabilities during the input program corrections.

10. The computer-implement method according to claim 7, wherein the fuzzy logic engine considers a plurality of metrics, the plurality of metrics comprising:
variety of complaining clients on each project;
number of complaining client on each project;
variety of projects from which complaints are received;
number of the projects; and
number of complaints.

11. The computer-implement method according to claim 10, wherein the fuzzy logic engine applies the following formula (I):

$$H = -\sum_{n=1}^{N} p_n \log p_n, \sum_{n=1}^{N} p_n = 1, \tag{I}$$

where $p_n$ is a percentage of errors among all mistakes made for all projects relative to a single pattern and N is a number of patterns.

12. The computer-implement method according to claim 7, wherein the analyzer configured to use taint analysis and/or symbolic interpretation analysis.

* * * * *